United States Patent [19]
Ritson

[11] Patent Number: 4,957,217
[45] Date of Patent: Sep. 18, 1990

[54] COFFEE FILTER PAPER DISPENSER

[76] Inventor: Wilbur Ritson, 820 E. Cameron Ave., West Covina, Calif. 91790

[21] Appl. No.: 431,688

[22] Filed: Nov. 3, 1989

Related U.S. Application Data

[63] Continuation of Ser. No. 217,371, Jul. 11, 1988, abandoned.

[51] Int. Cl.[5] ............................................. B65G 59/00
[52] U.S. Cl. .................................. 221/210; 294/1.1; 206/520
[58] Field of Search ............... 221/36, 210, 211, 213, 221/255, 259; 271/18.1, 18.3, 33; 294/1.1; D7/99, 400; 206/499, 515, 519, 520

[56] References Cited

U.S. PATENT DOCUMENTS

| | | | |
|---|---|---|---|
| 1,730,126 | 10/1929 | Dailey | 221/210 X |
| 2,443,520 | 6/1948 | Schwartz et al. | 221/213 |
| 3,032,236 | 5/1962 | Lewis et al. | 221/213 |
| 3,703,977 | 11/1972 | Pisarek | 221/213 |
| 4,093,297 | 6/1978 | Reiber | 221/210 X |
| 4,214,673 | 7/1980 | Heath et al. | 221/259 |
| 4,285,114 | 8/1981 | Underdahl | 271/18.1 X |
| 4,600,227 | 7/1986 | Ennis et al. | 294/1.1 |
| 4,676,396 | 6/1987 | Mamalou | 221/36 |
| 4,739,902 | 4/1988 | Joslyn et al. | 221/210 X |
| 4,805,801 | 2/1989 | Knopf | 221/210 |
| 4,836,592 | 6/1989 | Roberts | 294/1.1 |
| 4,848,815 | 7/1989 | Molloy | 294/1.1 |

FOREIGN PATENT DOCUMENTS 0124852  4/1984  European Pat. Off. .

Primary Examiner—H. Grant Skaggs
Assistant Examiner—Boris Milef
Attorney, Agent, or Firm—Boniard I. Brown

[57] ABSTRACT

A dispenser mechanism is provided for removing a filter paper from a stack of filter papers without disturbing other papers of the stack. A gripper member is manually rotated to rotate the topmost filter paper relative to the next lower paper of the stack. Surfaces of the uppermost and next lower papers rub against each other to break area surface contact. Peripheral corrugations on the papers may cam over each other to break the area surface contact. Then, the paper can readily be lifted and removed.

11 Claims, 1 Drawing Sheet

COFFEE FILTER PAPER DISPENSER

This is a continuation of Ser. No. 217,371 filled 7-11-88, now abandoned.

BACKGROUND OF THE INVENTION

This invention relates to a mechanism for dispensing individual coffee filter papers from a stack of filter papers, whereby the individual filter paper is made available for use in a coffee maker.

Under conventional practice coffee filter papers are supplied to the user in the form of a stack of papers in nested relationship; usually the stack of filter papers comes to the user in a square cardboard box slightly larger than the diameter of the filter paper stack. The box is often stored in the vicinity of the coffee maker where the user can remove individual filter papers, as needed to make new pots of coffee.

The nested relationship of the filter papers causes the papers to be semi-tightly adhered to one another. The filter papers are very thin, such that the edges of the individual papers are very close together; it is difficult for the average user to grasp an individual paper for extraction from the stack. Often the user inadvertantly removes several filter papers from the stack. Since the user can make use of only one paper at a time he or she must separate one paper from the other extracted papers, and then return the other papers back into the box. The returned filter papers tend to collect loosely in the box, sometimes overflowing the box.

SUMMARY OF THE INVENTION

My invention is directed to a mechanism for removing an individual coffee filter paper from a stack of filter papers without disturbing any papers other than the one being removed. In one of its forms the invention comprises a manual handle structure having a dependent paper gripper means that can be engaged with the topmost paper in a stack of filter papers; a contact adhesive on the face of the gripper means draws the topmost filter paper from the stack without disturbing the other papers.

The paper-remover mechanism can be included as part of the original package in which the stack of papers is shipped or sold. Alternately the mechanism can be part of a separate dispenser that is retained by the user, separate from the shipping package.

THE DRAWINGS

DESCRIPTION OF A PREFERRED EMBODIMENT OF THE INVENTION

Figure 1:
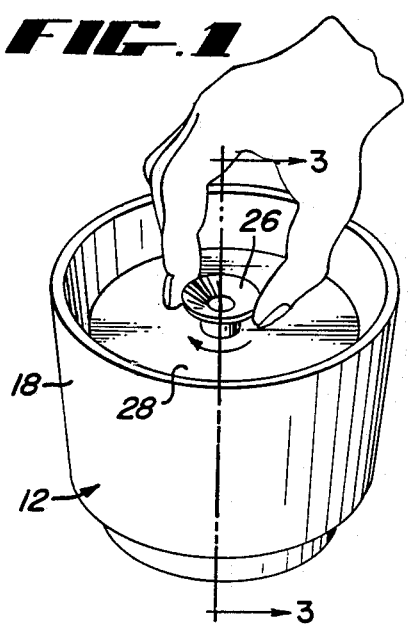
FIG. 1 is a perspective view of a dispenser mechanism embodying my invention.

FIG. 1 illustrates one form that the invention can take. A stack of filter papers 10 is stored within an open-topped container 12. Each filter paper is a thin porous paper element having a circular plan outline. The central circular area 14 of each filter paper is flat, whereas the outer annular peripheral area 16 of each filter paper is corrugated, whereby when the paper is used in a coffee maker to contain coffee granules the paper assumes a cup-like configuration.

Figure 3:
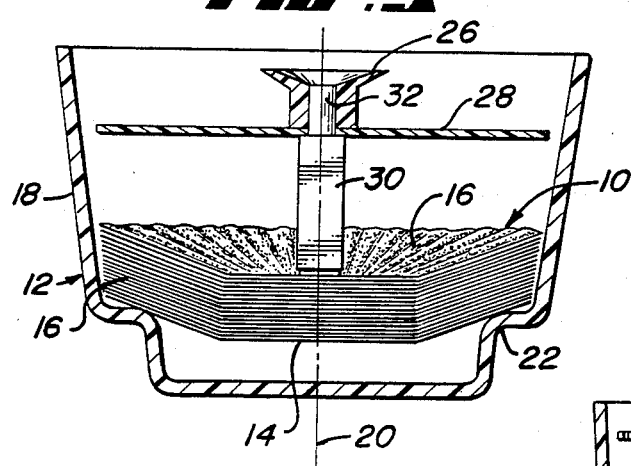
FIG. 3 is a sectional view taken on line 3—3 in FIG. 1.

While the filter papers are in stacked form in container 12 the annular peripheral areas 16 of the papers are inclined outwardly and upwardly relative to central areas 14 of the papers, as shown generally in FIG. 3. The peripheral corrugations of adjacent papers nest within one another.

The peripheral side wall 18 of container 12 preferably has a frusto-conical configuration, such that the wall tapers downwardly and inwardly toward the container central axis 20. There is at least a slight annular clearance between the inner surface of the container side wall and the peripheral edge of each stacked filter paper, whereby an individual filter paper can be rotated slightly and lifted out of the container without frictional interference from the container side wall.

Figure 4:
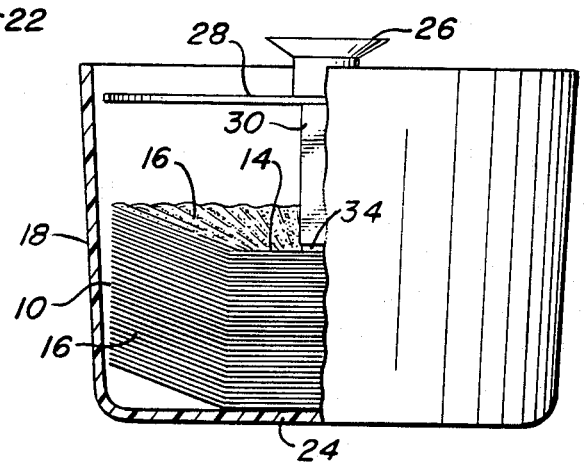
FIG. 4 is a view taken in the same direction as FIG. 3, but illustrating another embodiment of the invention.

The stack of filter papers can be centrally supported on an annular shoulder 22, as shown in FIG. 3. Alternately the stack of filter papers can be supported on the container bottom wall 24, as shown in FIG. 4. The FIG. 3 arrangement may have an advantage in that it tends to centralize the stack of filter papers on container axis 20.

My invention is especially concerned with a mechanism for removing the topmost filter paper from the stack without disturbing other papers in the stack. The mechanism comprises a knob-like handle structure 26 suitably attached to a dust cover 28 on the cover axis. A post or rod element 30 depends from the dust cover so that its lower face is engaged with a central point on the topmost paper in the filter paper stack. Dust cover 28 is preferably a circular disk having approximately the same diameter as the filter paper stack; the edge of the dust cover is spaced away from container wall 18. Post element 30 is preferably of such length as to space cover 28 from the topmost filter paper.

Components 26, 28 and 30 may be rigidly connected together in several different ways. For example, post element 30 can have a cylindrical extension 32 press fit into a bore in knob 26 so as to hold disk 28 between the post element and the knob.

A principal feature of my invention includes a paper gripper means formed on the lower end of post element 30. In a preferred form the paper gripper means comprises a film of contact adhesive on the lower face of element 30; the adhesive may be applied directly to the end face of element 30, or it may be incorporated into an adhesive strip 34 permanently attached to the post element lower face Alternatively, several adhesive strips may be stacked in series, on the lower end of element 30; as one adhesive strip loses its adhesive properties it is torn off to expose a new adhesive strip to the topmost filter paper. Any suitable contact adhesive may be used, one example being an adhesive marketed by Super Glue Corporation of Holly, N.Y. under the tradename "Handy Tak".

It is believed that the paper gripper means could take other forms than an adhesive, for example, a suction cup or a multiplicity of very short spikes (short enough to penetrate only the topmost filter paper).

Figure 2:
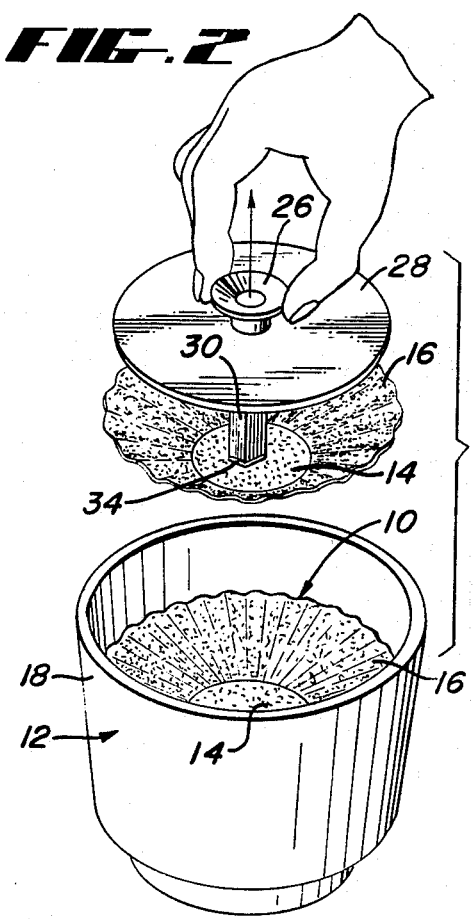
FIG. 2 is a view similar to FIG. 1, but showing the components in a separated condition incident to removal of an individual filter paper from a filter paper stack.

In use of the mechanism, knob 26 is manually rotated around central axis 20 to apply a rotary drive force to the topmost filter paper. The corrugations in the topmost filter paper tend to ride up on the corrugations of the subjacent filter paper; as a result the topmost filter paper tends to be raised away from the remaining papers in the stack. Once the corrugations on the two adjacent papers are out of phase (i.e. no longer nested) there is a minimal adhesion (facial contact) between the topmost paper and the next lower paper. After a small rotation of knob 26 the knob can be lifted to remove the topmost filter paper from the stack, as indicated in FIG. 2. The separated filter paper can be easily removed from the lower end of post element 30.

Figure 5:
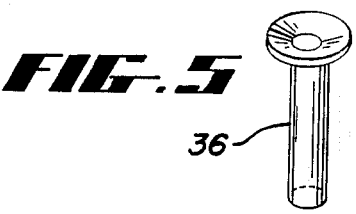
FIG. 5 is a perspective view of a modified post or rod element utilized with the invention.

The post element may preferably be of polygonal cross-section, such as the square cross-sectioned post structure of FIG. 2. Such a cross-section provides corner areas on the post element that tend dig into the surface of the topmost filter paper, thereby providing an enhanced rotary force transmission from the post element to the filter paper. The post element may be of circular cross section, as indicated at 36 in FIG. 5. The peripheral portion of the circular end portion provides good adhesive engagement with the filter paper to provide good rotary force transmission.

The paper remover mechanism is shown in association with a special container that is used to store a stack of filter papers at the point of use. The paper remover mechanism could be incorporated into the shipping package (box) used to house the filters at the point of sale. A specific structure is shown in the drawings. Some structural variations may be employed while still practicing the invention.

Thus there has been shown and described a novel coffee filter paper dispenser which fulfills all the objects and advantages sought therefor. Many changes, modifications, variations and other uses and applications of the subject invention will, however, become apparent to those skilled in the art after considering this specification together with the accompanying drawings and claims. All such changes, modifications, variations and other uses and applications which do not depart from the spirit and scope of the invention are deemed to be covered by the invention which is limited only by the claims which follow.

I claim:

1. A dispenser of individual coffee filter papers from a stack of such papers, wherein each filter paper has a circular plan area including a central flat area and a radially corrugated annular peripheral area, the papers being stacked with their central areas in close contact, with their peripheral areas extending outwardly and upwardly and with the corrugations thereof in nesting relation, said dispenser comprising:

an open-topped container having an inner wall surface defining a cross-sectional area sized in relation to the circular plan area of the filter paper stack that frictional engagement between the inner wall surface and the outer peripheral edge surfaces of the papers is minimized, whereby the filter papers may be rotated about a central axis of the central flat areas of the papers without distortion of the papers by engagement with the container inner wall surface, and whereby individual filter papers may be drawn upwardly through the open top of the container without substantially deforming the papers, a dust cover disposed in the container atop the stack of filters papers, and having thereon manual engagement means for facilitating grasping of the dust cover, a central post element extending downwardly from the dust cover and having an end face engagable with the central flat area of the uppermost paper in the filter paper stack, and a contact adhesive material on the lower face of the post element to exert a gripper force on the uppermost filter paper, whereby upon manual rotation of the dust cover the uppermost paper in the stack is rotated to cause the corrugations thereof to ride over the corrugations of the next lower paper so that the corrugations of the two papers are out of phase and registration and not adhered, thus to permit ready and convenient lifting of the uppermost paper from the stack by lifting of the dust cover.

2. The dispenser of claim 1, wherein: said container inner wall surface defines a cross-sectional area larger than the circular plan area of the filter paper stack, whereby an annular clearance space is defined between the outer peripheral edges of the papers and the container inner wall surface.

3. The dispenser of claim 1, wherein:

the container inner wall surface is generally cylindrical, and the dust cover is circular in top plan dimension and is sized to fit freely atop the stack of filter papers and within the inner wall surface of the container.

4. The dispenser of claim 3, wherein:

the manual engagement means comprises a knob on the upper surface of the dust cover.

5. The dispenser of claim 1, wherein:

said container wall has an upper edge defining a mouth opening wider than the circular plan area of the filter papers, whereby individual filters papers may be drawn upwardly through the mouth opening without substantially deforming the paper.

6. The dispenser of claim 1, wherein:

the post element is rigid to accommodate downward manual force thereon, the post element is so positioned that its lower face engages the uppermost filter paper at the central axis of the central flat areas of the papers, and the lower face of the post element is flat and generally parallel to the central areas of the papers, whereby substantial surface area is in contact with the surface of the uppermost paper.

7. The dispenser of claim 1, wherein:

the lower face of the post element has a polygonal planar shape with plural side edges and connecting corners, said knob being manually rotatable so that the corners on the post element lower face penetrate slightly and distort the surface of the uppermost filter paper, thereby providing enhanced engagement for rotary force transmission between the post element and the filter paper.

8. The dispenser of claim 6, wherein:

the lower face of the post element has a polygonal planar shape with plural side edges and connecting corners, said knob being manually rotatable so that the corners on the post element lower face penetrate slightly and distort the surface of the uppermost filter paper, thereby providing enhanced engagement for rotary force transmission between the post element and the filter paper.

9. The dispenser of claim 1, and further including:

an inwardly extending shoulder of the container wall to support the peripheral corrugated portions of the stacked filter papers to position the peripheral corrugated portions for rotation of the uppermost filter paper to cause the corrugations of the uppermost paper to ride over those of the next lower paper.

10. A dispenser of individual coffee filter papers from a stack of such papers, wherein each filter paper has a circular plan area including a central flat area and a radially corrugated annular peripheral area, the papers being stacked with their central areas in close contact, with their peripheral areas extending outwardly and upwardly and with the corrugations thereof in nesting relation, said dispenser comprising:
- an open-topped container having an inner side wall surface defining a circular cross-sectional area larger than the circular plan area of the filter paper stack, whereby frictional engagement between the inner wall surface and the outer peripheral edge surfaces of the papers is prevented and the filters papers are rotatable about a central axis of the central flat areas of the papers without distortion of the papers by engagement with the container inner wall surface,
- said container having an annular side wall with an upper edge defining a mouth opening wider than the circular plan area of the filter papers, whereby individual filters papers may be drawn upwardly through the mouth opening without deforming the paper,
- a circular dust cover disposed within the container above the stack of filter papers,
- manual engagement means for facilitating grasping of the dust cover and extending upwardly from the dust cover at a central point thereon,
- a rigid non-deformable post element connected to said manual engagement means and extending downwardly from the dust cover,
- said post element having a substantially flat lower end face engageable with the central flat area of the uppermost paper in the filter paper stack, said flat end face extending parallel to the central areas of the filter papers, whereby said flat end face has substantial area contact with the upper surface of the uppermost paper, and
- contact adhesive material on the lower end face of the post element to exert a gripper force on the uppermost filter paper,
- whereby upon a slight manual twist rotation of the manual engagement means the uppermost paper in the stack is rotated to cause the corrugations thereof to ride over the corrugations of the next lower paper so that the corrugations of the two papers are out of phase and registration and not adhered, thus to permit ready and convenient lifting of the uppermost paper from the stack by lifting of the manual engagement means.

11. A dispenser according to claim 10, wherein:
the lower end face of the rigid post element has a polygonal planar configuration with plural side edges and connecting corners,
said manual engagement means being actuable so that the corners on the post element lower face slightly penetrate and distort the surface of the uppermost filter paper, thereby providing enhanced engagement for rotary transmission between the post element and the filter paper.

* * * * *